US008315516B2

(12) United States Patent
Nakashima (10) Patent No.: US 8,315,516 B2
(45) Date of Patent: Nov. 20, 2012

(54) SIGNAL TRANSMITTER, SIGNAL RECEIVER, AND SIGNAL TRANSMISSION SYSTEM

(75) Inventor: Yasutaka Nakashima, Kanagawa (JP)

(73) Assignee: Sony Corporation, Tokyo (JP)

( * ) Notice: Subject to any disclaimer, the term of this patent is extended or adjusted under 35 U.S.C. 154(b) by 424 days.

(21) Appl. No.: 12/640,647

(22) Filed: Dec. 17, 2009

(65) Prior Publication Data

US 2010/0178050 A1 Jul. 15, 2010

(30) Foreign Application Priority Data

Jan. 9, 2009 (JP) .................................. 2009-004109

(51) Int. Cl.
*H04B 10/08* (2006.01)

(52) U.S. Cl. ............................................................ 398/5

(58) Field of Classification Search ........................ 398/5
See application file for complete search history.

(56) References Cited

U.S. PATENT DOCUMENTS

| | | | | |
|---|---|---|---|---|
| 5,069,521 A * | 12/1991 | Hardwick | ........................ | 385/24 |
| 7,302,190 B2 * | 11/2007 | Goto et al. | ..................... | 398/182 |
| 7,496,294 B2 * | 2/2009 | Takemoto et al. | ................. | 398/5 |

FOREIGN PATENT DOCUMENTS

| | | |
|---|---|---|
| JP | 6-197080 A | 7/1994 |
| JP | 2003-209522 A | 7/2003 |
| JP | 2003-229816 | 8/2003 |

OTHER PUBLICATIONS

Japanese Office Action issued on Nov. 30, 2010 in corresponding Japanese Application No. 2009-004109.

* cited by examiner

*Primary Examiner* — Leslie Pascal
(74) *Attorney, Agent, or Firm* — Oblon, Spivak, McClelland, Maier & Neustadt, L.L.P.

(57) ABSTRACT

A signal transmitter includes: a main transmission line-transmitting portion that transmits optical signals through main transmission lines; a backup transmission line-transmitting portion that transmits the optical signals through backup transmission lines paired with the main transmission lines; a selector that selects a transmission line to be used for transmitting the signals from any of the transmission lines through which the signals are transmitted by the main transmission line-transmitting portion and the backup transmission line-transmitting portion; and a controller that, when a fault occurs on at least one main transmission line, outputs a switching command to the selector based on information identifying the main transmission line with the fault, thus causing the main transmission line-transmitting portion to stop transmitting the signals to the main transmission line with the fault, while causing the backup transmission line-transmitting portion to transmit the signals being transmitted to the main transmission line with the fault to the backup transmission lines.

14 Claims, 5 Drawing Sheets

FIG.1

EXEMPLARY EXTERNAL CONFIGURATION OF SIGNAL TRANSMISSION SYSTEM

FIG.4 EXEMPLARY INTERNAL CONFIGURATION OF SIGNAL TRANSMISSION SYSTEM

SIGNAL TRANSMITTER, SIGNAL RECEIVER, AND SIGNAL TRANSMISSION SYSTEM

BACKGROUND OF THE INVENTION

1. Field of the Invention

The present invention relates to a signal transmitter, a signal receiver, and a signal transmission system which are preferably used for transmitting optical signals.

2. Description of the Related Art

In the related art, a transmission system is known which connects a signal transmitter and a signal receiver through an optical transmission line such as an optical fiber and transmits a large quantity of data by converting them to optical signals. The optical fiber is capable of transmitting optical signals with a small signal loss and over a long distance. Moreover, large-capacity data communication has been made possible by multiplexing optical signals.

JP-A-2003-229816 discloses an optical transmission line switching system that transmits optical signals.

SUMMARY OF THE INVENTION

However, the optical transmission line has a configuration such that one optical transmission line is provided for each optical connector, and a required transmission bandwidth is secured by optical multiplexing. For this reason, when an optical connector connected to the optical transmission line is contaminated with dust or the like or broken, it is difficult to transmit optical signals without data loss. In this case, switching is performed to a backup optical transmission line so that the optical signals are transmitted through the backup optical transmission line.

However, the backup optical transmission line requires many optical connectors and cables. However, the operation of connecting cables to the optical connectors and handling the wirings is troublesome, which is likely to result in connection errors or take too much time for connecting them. Moreover, since many optical connectors are mounted on the signal transmitter and the signal receiver, the size of the signal transmitter and the signal receiver is likely to increase.

Thus, it is therefore desirable to increase optical signal transmission quality.

According to an embodiment of the present invention, there is provided a signal transmitter which includes a main transmission line-transmitting portion that transmits optical signals through a plurality of main transmission lines and a backup transmission line-transmitting portion that transmits the optical signals through backup transmission lines paired with the main transmission lines.

The signal transmitter further includes a selector that selects a transmission line to be used for transmitting the optical signals from any of the transmission lines through which the optical signals are transmitted by the main transmission line-transmitting portion and the backup transmission line-transmitting portion.

The signal transmitter further includes a controller that outputs a switching command to the selector to select the transmission line to be used for transmitting the optical signals. When a fault occurs on at least one of the main transmission lines, the controller receives information identifying the main transmission line with the fault from a signal receiver receiving the optical signals.

Moreover, based on this information, the controller causes the main transmission line-transmitting portion to stop transmitting the optical signals to the main transmission line with the fault, while causing the backup transmission line-transmitting portion to transmit the optical signals being transmitted to the main transmission line with the fault to the backup transmission lines.

According to another embodiment of the present invention, there is provided a signal receiver which includes a main transmission line-receiving portion that receives optical signals through main transmission lines and a backup transmission line-receiving portion that receives the optical signals through backup transmission lines paired with the main transmission lines.

The signal receiver further includes a selector that selects a transmission line to be used for receiving the optical signals from any of the transmission lines through which the optical signals are received by the main transmission line-receiving portion and the backup transmission line-receiving portion.

The signal receiver further includes a controller that outputs a switching command to the selector to select the transmission line to be used for receiving the optical signals. When a fault occurs on at least one of the main transmission lines, the controller transmits information identifying the main transmission line with the fault to a signal transmitter transmitting the optical signals.

The controller causes the main transmission line-receiving portion to stop receiving the optical signals from the main transmission line with the fault while causing the backup transmission line-receiving portion to receive the optical signals being received from the main transmission line with the fault to a backup transmission line designated by the signal transmitter.

According to a further embodiment of the present invention, there is provided a signal transmission system which includes the above-described signal transmitter and the above-described signal receiver.

With this configuration, the optical signals can be transmitted continuously by switching the main transmission line with the fault to the backup transmission line.

According to the above-described embodiments of the present invention, since the optical signals can be transmitted continuously by switching the main transmission line with the fault to the backup transmission line, it is possible to provide increased fault resistance to faults occurring on the main transmission lines or the backup transmission lines.

DETAILED DESCRIPTION OF PREFERRED EMBODIMENTS

Hereinafter, best modes for carrying out the present invention (hereinafter referred to as embodiments) will be described. The description will be given in the following order:

1. First Embodiment (Optical Signal Transmission Control: Exemplary Process wherein Signal Receiver Selects Optical Transmission Line Upon Occurrence of Fault on Main Transmission Line);
2. Second Embodiment (Optical Signal Transmission Control: Exemplary Process wherein Signal Transmitter Selects Optical Transmission Line); and
3. Modified Example

1. First Embodiment

Figure 1:
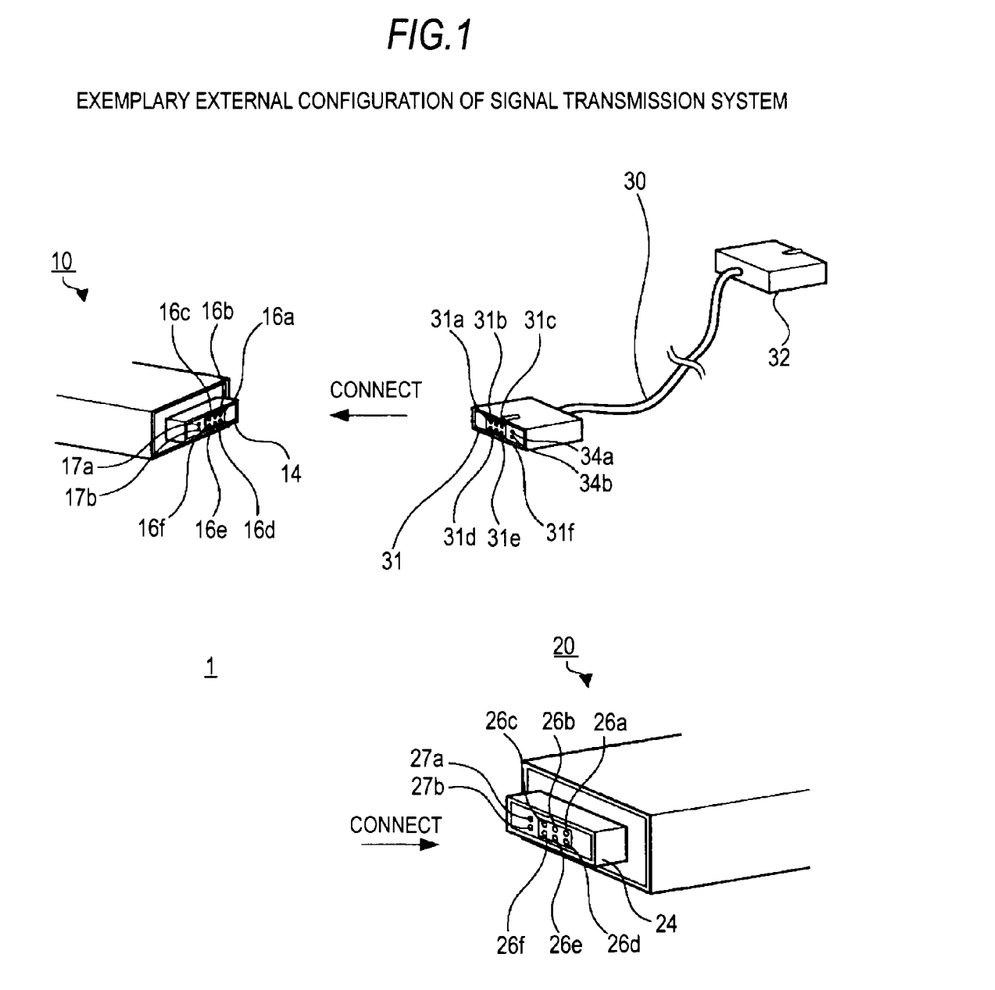
FIG. 1 is a schematic diagram showing an exemplary external configuration of an example of an optical signal transmission system according to a first embodiment of the present invention.

Hereinafter, a first embodiment of the present invention will be described with reference to FIGS. 1 to 3. In this embodiment, an example will be described in which the present invention is applied to a signal transmission system 1 having a signal transmitter 10 and a signal receiver 20.
Exemplary External Configuration of Signal Transmission System FIG. 1 illustrates an exemplary external configuration of the signal transmission system 1.

The signal transmission system 1 includes the signal transmitter 10 that transmits optical signals and the signal receiver 20 that receives the optical signals. The signal transmitter 10 and the signal receiver 20 are connected by a cable 30 through which optical signals and electrical signals are transmitted. In this example, the cable 30 includes six optical transmission lines in which four optical transmission lines are used as main transmission lines, and the remaining two optical transmission lines are used as backup transmission lines. Furthermore, the cable 30 includes a communication line for transmitting a control signal, and the optical transmission lines and the communication line are incorporated in the cable 30.

The signal transmitter 10 includes an optical connector 14 that converts electrical signals to optical signals and transmits the optical signals to the cable 30. The optical connector 14 includes six contacts 16a to 16f for transmitting optical signals to the optical transmission lines (see FIG. 2 described later) of the cable 30 and two contacts 17a and 17b for transmitting/receiving electrical signals through the communication line of the cable 30.

The signal receiver 20 includes an optical connector 24 that converts the optical signals received through the cable 30 to electrical signals. The optical connector 24 includes six contacts 26a to 26f for receiving optical signals from the optical transmission lines of the cable 30 and two contacts 27a and 27b for receiving electrical signals from the communication line of the cable 30.

The cable 30 includes an optical connector 31 which is provided at one end thereof to be connected to the optical connector 14 of the signal transmitter 10 and an optical connector 32 which is provided at the other end thereof to be connected to the optical connector 24 of the signal receiver 20. The cable 30 includes at least one main transmission line and at least one backup transmission line.

The signal receiver 20 of this example detects presence of a fault on the optical transmission lines by detecting a decrease in the optical level of the received optical signals or monitoring errors by converting the optical signals to electrical signals. To monitor the errors electrically, a process of embedding an error check code such as CRC (cyclic redundancy check) in electrical signals.

The detection of presence of a fault occurring on the optical transmission lines may be performed at the time of starting the signal transmitter 10 or the signal receiver 20 or may be performed at all times or at a certain time that is designated by a user.
Exemplary Internal Configuration of Signal Transmission System FIG. 2 illustrates an exemplary internal configuration of the signal transmission system 1.

The signal transmitter 10 includes input ports 11a to 11d to which first to fourth electrical signals are input in the serial mode, respectively, and a first selector 12 that selects an optical transmission line to be used for transmitting the first to fourth input electrical signals. The first selector 12 is a router, for example, and selects a transmission line to be used for transmitting optical signals from any of the transmission lines through which the optical signals are transmitted by a main transmission line-transmitting portion 19a and a backup transmission line-transmitting portion 19b.

Furthermore, the signal transmitter 10 includes electrical signal processors 13a to 13f that perform predetermined processing on the electrical signals which are transmitted to the optical transmission line selected by the first selector 12. The electrical signal processors 13a to 13f perform processing of embedding the above-described error check code in the electrical signals, for example.

Furthermore, the signal transmitter 10 includes electrical-to-optical converters 15a to 15f that convert the electrical signals, which are supplied from the electrical signal processors 13a to 13f respectively and are transmitted to the optical transmission line selected by the first selector 12, to optical signals. Furthermore, the signal transmitter 10 includes contacts 16a to 16f that interface with the optical connector 31 of the cable 30.

Furthermore, the signal transmitter 10 includes a contact 17a through which a control signal is transmitted to the signal receiver 20, a contact 17b through which a control signal is received from the signal receiver 20, and a first controller 18 that controls the operation of each part of the signal transmitter 10. When a fault occurs on at least one of the main transmission lines, the first controller 18 causes the main transmission line-transmitting portion 19a to stop transmitting the optical signals to the main transmission line with the fault based on information identifying the main transmission line with the fault, which is received from the signal receiver 20. Moreover, the first controller 18 outputs a switching command to the first selector 12 to cause the backup transmission line-transmitting portion 19b to transmit the optical signals being transmitted to the main transmission line with the fault to the backup transmission lines.

On the other hand, the signal receiver 20 includes contacts 26a to 26f that interface with the optical connector 32 of the cable 30 so as to receive the optical signals from the signal transmitter 10. Furthermore, the signal receiver 20 includes photoelectric converters 25a to 25f that convert the optical signals, which are received through the main transmission lines and the backup transmission lines and are supplied from the contacts 26a to 26f, respectively, to electrical signals.

Furthermore, the signal receiver 20 includes electrical signal processors 23a to 23f that perform predetermined processing on the electrical signals supplied from the photoelectric converters 25a to 25f, respectively. The electrical signal processors 23a to 23f decode the error check code embedded in the electrical signals to detect a lack of data during the transmission. In this way, a second controller 28 detects a fault occurring on the main transmission lines 33a to 33d. It should be noted that a method of detecting a fault occurring on the transmission lines and a system thereof are not particularly limited in the present invention. Therefore, the present invention also includes alterations to these embodiments.

Furthermore, the signal receiver 20 includes a second selector 22 that selects electrical signals to be supplied from the electrical signal processors 23a to 23f and output ports 21a to 21d through which the electrical signals selected by the second selector 22 are output as first to fourth electrical signals, respectively. The second selector 22 is a router, for example, and selects a transmission line to be used for receiving the optical signals from any of the transmission lines through which the optical signals are received by a main transmission line-receiving portion 29a and a backup transmission line-receiving portion 29b.

Furthermore, the signal receiver 20 includes a contact 27a through which a control signal is transmitted to the signal transmitter 10, a contact 27b through which a control signal is received from the signal transmitter 10, and a second controller 28 that controls the operation of each part of the signal receiver 20. When a fault occurs on at least one of the main transmission lines, the second controller 28 transmits information identifying the main transmission line with the fault to the signal transmitter 10 that transmits the optical signals and causes the main transmission line-receiving portion 29a to stop receiving the optical signals from the main transmission lines with the fault. Moreover, the second controller 28 outputs a switching command to the second selector 22 so that the optical signals being received from the main transmission line with the fault are received from the backup transmission line designated by the signal transmitter 10.

Here, the cable 30 includes four main transmission lines 33a to 33d and two backup transmission lines 34a and 34b. As the main transmission lines 33a to 33d and the backup transmission lines 34a and 34b, optical fiber cables are used, for example, in order to transmit optical signals. Furthermore, the cable 30 includes a communication line 37a for transmitting electrical signals from the signal receiver 20 to the signal transmitter 10 and a communication line 37b for transmitting electrical signals from the signal transmitter 10 to the signal receiver 20.

The optical connector 31 of the cable 30 includes contacts 31a to 31f that interface with the contacts 16a to 16f of the optical connector 14 of the signal transmitter 10, respectively. Furthermore, the optical connector 31 includes contacts 35a and 35b that interface with the contacts 17a and 17b of the optical connector 14 of the signal transmitter 10.

Moreover, the optical connector 32 of the cable 30 includes contacts 32a to 32f that interface with the contacts 26a to 26f of the optical connector 24 of the signal receiver 20. Furthermore, the optical connector 32 includes contacts 36a and 36b that interface with the contacts 27a and 27b of the optical connector 24 of the signal receiver 20.

In this example, the electrical signal processors 13a to 13d, the electrical-to-optical converters 15a to 15d, and the contacts 16a to 16d, which are included in the signal transmitter 10, will be collectively referred to as a main transmission line-transmitting portion 19a that transmits optical signals via a plurality of main transmission lines 33a to 33d. Moreover, the electrical signal processors 13e and 13f, the electrical-to-optical converters 15e and 15f, and the contacts 16e and 16f will be collectively referred to as a backup transmission line-transmitting portion 19b that transmits optical signals through the backup transmission lines 34a and 34b that are paired with the main transmission lines 33a to 33d.

On the other hand, the electrical signal processors 23a to 23d, the photoelectric converters 25a to 25d, and the contacts 26a to 26d, which are included in the signal receiver 20, will be collectively referred to as a main transmission line-receiving portion 29a that receives optical signals through the main transmission lines 33a to 33d. Moreover, the electrical signal processors 23e and 23f, the photoelectric converters 25e and 25f, and the contacts 26e and 26f will be collectively referred to as a backup transmission line-receiving portion 29b that receives optical signals through the backup transmission lines 34a and 34b that are paired with the main transmission lines 33a to 33d.

The second controller 28 of the signal receiver 20 identifies a main transmission line in which there is a possibility of a fault when a fault such as an error is detected in electrical signals by any of the electrical signal processors 23a to 23f. The second controller 28 may detect a fault on the main transmission lines from a decrease in level of the optical signals which is detected by the photoelectric converters 25a to 25f.

Next, the second controller 28 transmits information identifying the main transmission line with the fault to the signal transmitter 10 through the communication line 37a for transmitting a control signal. Then, the second controller receives information identifying a switched backup transmission line from the signal transmitter 10 through the communication line 37b. The information is included in the control signal.

On the other hand, the first controller 18 of the signal transmitter 10 receives the information identifying the main transmission line with the fault from the signal receiver 20 through the communication line 37a. Next, based on the information, the signal transmitter 10 outputs a command to the first selector 12 to perform switching to any one of the main transmission line-transmitting portion 19a and the backup transmission line-transmitting portion 19b so that the optical signals are transmitted through the backup transmission line designated by the signal receiver 20. Then, the signal transmitter 10 transmits information identifying the switched backup transmission line to the signal receiver 20.

In this way, it is possible to take quick measures even when a fault occurs on the cable 30.

Figure 3:
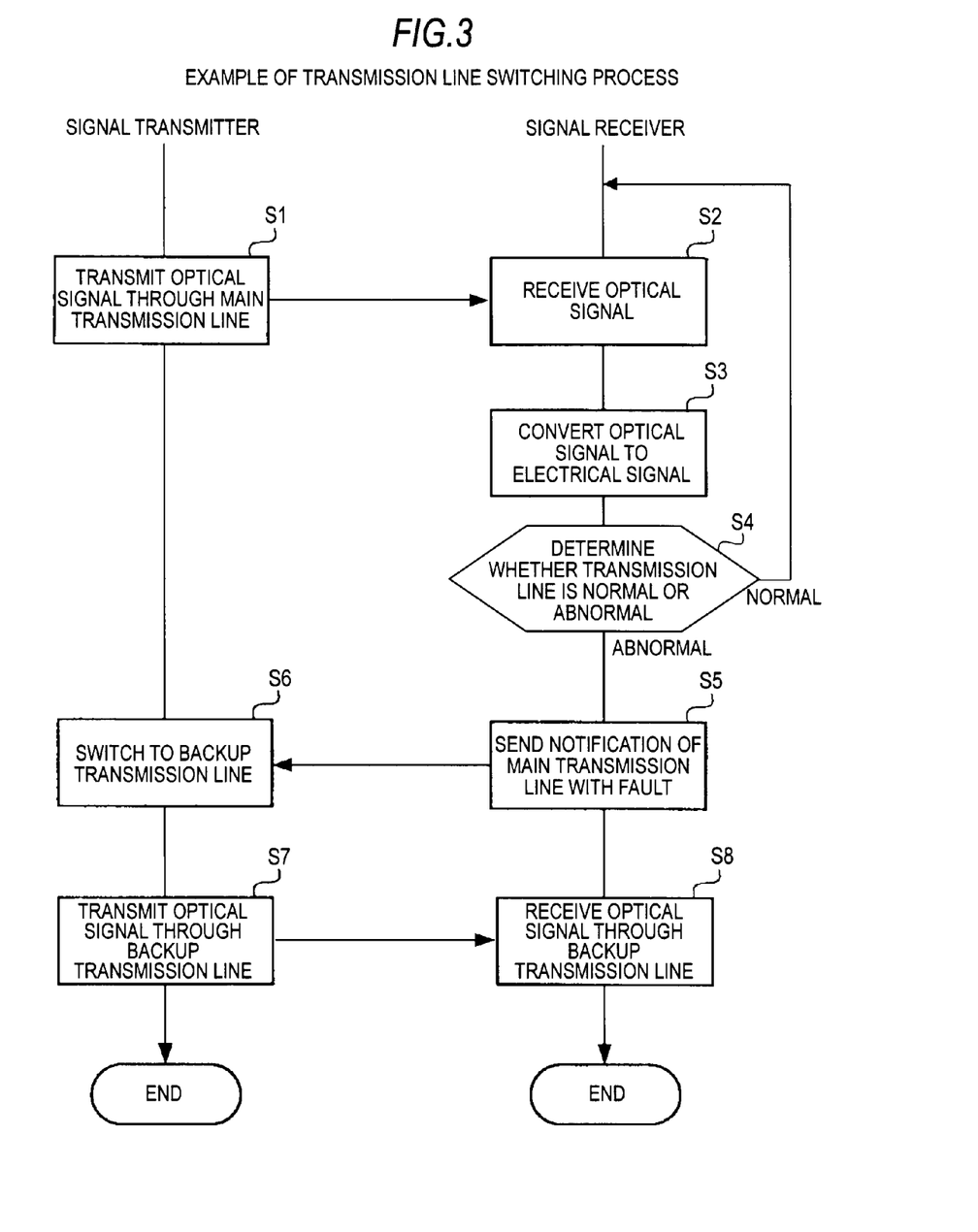
FIG. 3 is a flowchart showing an example of a process wherein a signal receiver selects a transmission line, according to the first embodiment of the present invention.

FIG. 3 illustrates an example of a switching process from a main transmission line to a backup transmission line.

First, the signal transmitter 10 transmits optical signals through the main transmission lines (step S1). On the other hand, the signal receiver 20 receives the optical signals through the main transmission lines (step S2). The optical axis changing elements 25a to 25f convert the optical signals to electrical signals (step S3).

Next, the electrical signal processors 23a to 23f decode an error check code embedded in the converted electrical signals and send a notification as to occurrence of an error in each main transmission line to the second controller 28. The second controller 28 determines the normality of the main transmission line based on the error occurrence notification sent from the electrical signal processors 23a to 23f (step S4).

When the second controller 28 determines that the main transmission lines are normal, the process flow proceeds to step S2 where the optical signals are continuously received through the main transmission lines. On the other hand, when the second controller 28 determines that a fault has occurred on some of the main transmission lines, the second controller 28 identifies the main transmission line with the fault.

Next, the second controller 28 stops the use of the main transmission line with the fault and sends a notification of information identifying the main transmission line with the fault to the first controller 18 (step S5). At that time, the second controller 28 may output a switching command to the first controller 18 through the communication line 37a so that the transmission of the optical signals is switched to any one of the backup transmission lines 34a and 34b.

Next, upon receiving the notification of the main transmission line with the fault from the second controller 28, the first controller 18 performs a switching control so that the main transmission line in the notification is switched to the backup transmission line (step S6). Next, the signal transmitter 10 transmits the optical signals using the main transmission lines without faults and the switched backup transmission lines (step S7).

Then, the signal receiver 20 receives the optical signals through the switched backup transmission line (step S8). The signal receiver 20 continuously monitors occurrence of a fault on the main transmission lines and the backup transmission lines through which the optical signals are transmitted.

In this manner, when the level of the optical signals passing through the main transmission lines 33a to 33d decreases, an error occurs, or it has become possible to expect occurrence of a fault, the signal receiver 20 sends a notification of information identifying the main transmission line with the fault to the signal transmitter 10. With this notification, the main transmission line with the fault can be switched to the backup transmission lines, and the optical signals of data that are being or will be transmitted through the main transmission line with the fault can be transmitted through the backup transmission lines without delay. Meanwhile, the data which have been transmitted by the signal transmitter 10 may be requested for retransmission by the signal receiver 20.

Figure 2:
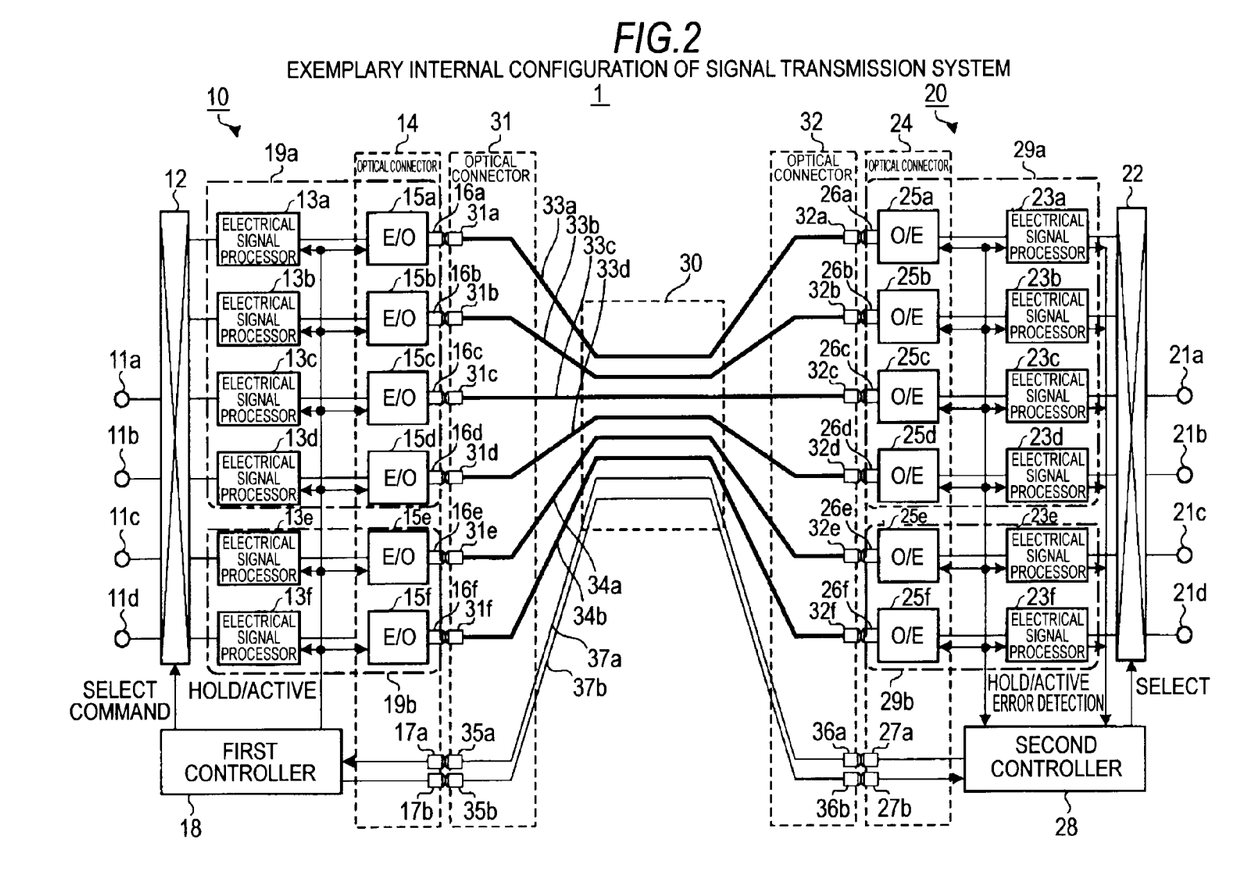
FIG. 2 is a block diagram showing an exemplary internal configuration of the optical signal transmission system according to the first embodiment of the present invention.

For example, as illustrated in FIG. 2, it will be assumed that a first optical signal converted from a first electrical signal is transmitted to the main transmission line 33a, and a second optical signal converted from a second electrical signal is transmitted to the main transmission line 33b. Similarly, it will be assumed that a third optical signal converted from a third electrical signal is transmitted to the main transmission line 33c, and a fourth optical signal converted from a fourth electrical signal is transmitted to the main transmission line 33d.

At that time, the first controller 18 decreases the power supplied to the electrical-to-optical converter corresponding to the main transmission line or the backup transmission line through which the optical signals are not transmitted so as to be lower than the power supplied to the electrical-to-optical converter corresponding to the main transmission line or the backup transmission line through which the optical signals are transmitted. For example, the first controller 18 performs a power control of decreasing or interrupting the power supplied to the electrical signal processors 13e and 13f and the electrical-to-optical converters 15e and 15f corresponding to the backup transmission lines 34a and 34b which are not in use.

On the other hand, the second controller 28 decreases the power supplied to the photoelectric converters corresponding to the main transmission lines or the backup transmission lines through which the optical signals are not transmitted so as to be lower than the power supplied to the photoelectric converters corresponding to the main transmission lines or the backup transmission lines through which the optical signals are transmitted. For example, the second controller 28 performs a power control of decreasing or interrupting the power supplied to the electrical signal processors 23e and 23f and the photoelectric converters 25e and 25f which are not in use.

Here, a case will be considered where it is unable to transmit the first and second optical signals properly due to a fault in any of the optical connectors 31 and 32 of the main transmission lines 33a and 33b or a fault occurred inside the cable 30. At that time, the electrical signal processors 23a and 23b of the signal receiver 20 detects a transmission error, whereby the second controller 28 identifies the optical transmission line with the fault. Then, the second controller 28 sends a notification of information identifying the optical transmission line with the fault to the first controller 18.

Upon receiving the information identifying the optical transmission line with the fault from the second controller 28, the first controller 18 performs a control of supplying power to the electrical signal processors 13e and 13f and the electrical-to-optical converters 15e and 15f corresponding to the backup transmission lines 34a and 34b which have begun to be used. At that time, the first controller 18 sends a notification of information identifying the backup transmission line which has begun to be used to the second controller 28. Then, the second controller 28 performs a control of supplying power to the electrical signal processors 23e and 23f and the photoelectric converters 25e and 25f which have begun to be used.

On the other hand, the first controller 18 performs a power control of decreasing or interrupting the power supplied to the electrical signal processors 13a and 13b and the electrical-to-optical converters 15a and 15b which are not in use. Similarly, the second controller 28 performs a power control of decreasing or interrupting the power supplied to the electrical signal processors 23a and 23b and the photoelectric converters 25a and 25b which are not in use. In this way, the power supplied to the optical transmission lines which are not in use is restricted, whereby the same power consumption suppression can be achieved as the case of supplying power to the minimum necessary optical transmission lines.

In the signal transmission system 1 according to the first embodiment described above, an example has been described in which the communication lines 37a and 37b for transmitting electrical signals are prepared in order to transmit a control signal. Electrical contacts are generally more resistant to dust or contamination than optical contacts, but high-speed signal transmission is difficult with electrical contacts. Although the control of switching the optical transmission lines does not require high-speed communication, the electrical communication lines 37a and 37b are used in order to realize a relatively stable control. For this reason, when it is necessary to control transmission lines at a high speed, and a bidirectional optical communication is performed or there is an optical communication line in the backward direction, an optical communication line may be used as the communication line for transmitting the control signal.

Moreover, since each of the optical connectors 14 and is equipped with each part corresponding to the main transmission lines and the backup transmission lines, it is not necessary to prepare a plurality of connector cables as the backup transmission lines. For this reason, the operation of connecting the connectors and handling the cables is made easy.

Moreover, even when some of the main transmission lines 33a to 33d are disconnected due to a fault in the optical connectors 14, 24, 31, and 32 resulting from dust adhering thereto, a contact failure, or damage to bonding portions or cables, the optical signals can be transmitted through the backup transmission lines 34a and 34b. For this reason, it is not necessary to prepare a new cable 30 or a new signal transmission system 1 or perform repairs or a cleaning operation even when the optical transmission lines are disconnected or a communication quality deteriorates due to dust, contact failures, or damage to the optical connector or the cable 30. Therefore, the possibility of using them without any replacement increases, and it is possible to obtain an advantage that maintenance of the signal transmission system 1 in dusty places is made easy.

Moreover, the supply of power is restricted for each part corresponding to the optical transmission lines which are unable to be used because the transmission quality decreases or disconnections occur due to dust, contact failures, or damage to bonding portions or cables. In this way, it is possible to enable simple maintenance in dusty places while achieving the same power consumption suppression as the case of supplying power to the minimum necessary transmission lines.

2. Second Embodiment

Next, a second embodiment of the present invention will be described with reference to FIGS. 4 and 5.

In this embodiment, an example will be described in which the present invention is applied to a signal transmission system 2 having a signal transmitter 40 and a signal receiver 50. In the following description, portions corresponding to those in FIGS. 1 and 2 described earlier in the first embodiment will be denoted by the same reference numerals, and detailed description thereof will be omitted.

Exemplary Internal Configuration of Signal Transmission System

Figure 4:
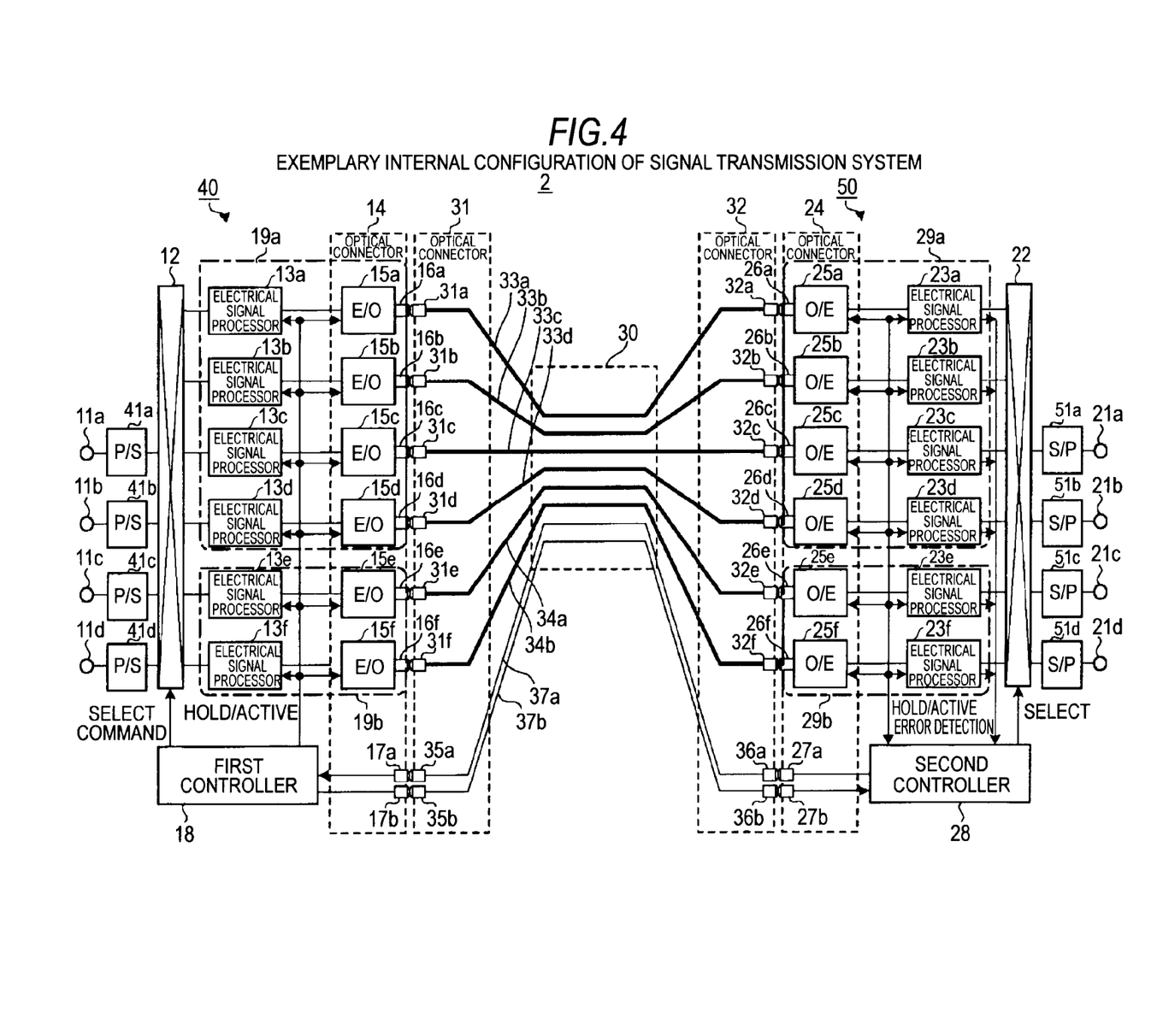
FIG. 4 is a block diagram showing an exemplary internal configuration of the optical signal transmission system according to a second embodiment of the present invention.

FIG. 4 illustrates an exemplary internal configuration of the signal transmission system 2.

The signal transmitter 40 includes parallel/serial converters 41a to 41d which correspond to input ports 11a to 11d, respectively. The parallel/serial converters 41a to 41d are used for converting electrical signals which are input in the parallel mode from the input ports 11a to 11d to electrical signals in the serial mode and supplying the electrical signals to a first selector 12. Other processing portions of the signal transmitter 40 are the same as the processing portions of the signal transmitter 10 according to the first embodiment. The signal transmitter 40 transmits optical signals to the signal receiver 50 through a cable 30.

The signal receiver 50 includes serial/parallel converters 51a to 51d which correspond to output ports 21a to 21d, respectively. The serial/parallel converters 51a to 51d are used for converting electrical signals which are input in the serial mode from a second selector 22 to electrical signals in the parallel mode and outputting the electrical signals to the output ports 21a to 21d. Other processing portions of the signal receiver 50 are the same as the processing portions of the signal receiver 20 according to the first embodiment. The signal receiver 50 converts the optical signals which are received in the serial mode from the signal transmitter 40 through the cable 30 to optical signals in the parallel mode and outputs the optical signals through the output ports 21a to 21d.

According to the signal transmission system 2 of the second embodiment described above, the parallel electrical signals input to the input ports 11a to 11d are converted to serial electrical signals, which are then converted to optical signals and transmitted to the signal receiver 50. Then, the signal receiver 50 converts the optical signals received through the cable 30 to serial electrical signals, which are then converted to parallel electrical signals and output from the output ports 21a to 21d. Therefore, the electrical signals input to the signal transmitter 40 can be transmitted regardless of whether they are in the serial mode or the parallel mode, therefore improving convenience.

3. Modified Example

In the signal transmission systems 1 and 2 according to the first and second embodiments, an example has been described in which the first selector 12 selects four optical transmission lines, and first to fourth optical signals are transmitted through the optical transmission lines without multiplexing. However, the first to fourth optical signals may be multiplexed to be appropriately divided and transmitted through three or less optical transmission lines.

Moreover, as a method of suppressing the power supplied to each part, a method of interrupting the power supplied to the electrical-to-optical converters, the photoelectric converters, or various signal processors or stopping supplying clock signals thereto may be used. However, since alterations thereto may easily occur to those skilled in the art, such alterations are also included in the present invention.

Moreover, although the communication lines 37a and 37b are described as being incorporated into the cable 30, the communication lines may be incorporated into wireless communications or other networks, for example. By doing so, it is possible to provide increased fault resistance.

Furthermore, in the first and second embodiments described above, although unidirectional optical transmission from the signal transmitter to the signal receiver is illustrated, any of the optical transmission lines may be backward directional or bidirectional. Furthermore, although the electrical-to-optical converters 15a to 15f are incorporated into the optical connector 14, the electrical-to-optical converters 15a to 15f may be provided at the outside of the optical connector 14, and only the contacts 16a to 16f may be included in the optical connector 14. Alternatively, in addition to the electrical-to-optical converters 15a to 15f, the first selector 12, the electrical signal processors 13a to 13f, and other processors may be incorporated into the optical connector 14. Similarly, the same modifications may be applied to the optical connector 24.

Furthermore, the switching command for switching from the main transmission lines to the backup transmission lines may be issued by the signal receiver 20 regardless of occurrence of a fault on the transmission line. In this case, the first controller 18 performs a process of switching from the main transmission lines to the backup transmission lines so that optical signals are transmitted through the selected backup transmission lines 34a and 34b. Specifically, the first controller 18 outputs a switching command to the first selector 12 to perform switching from one of the main transmission lines 33a to 33d used by the main transmission line-transmitting portion 19a to one of the backup transmission lines 34a and 34b. Moreover, the first controller 18 transmits information identifying the switched backup transmission line to the signal receiver 50.

Figure 5:
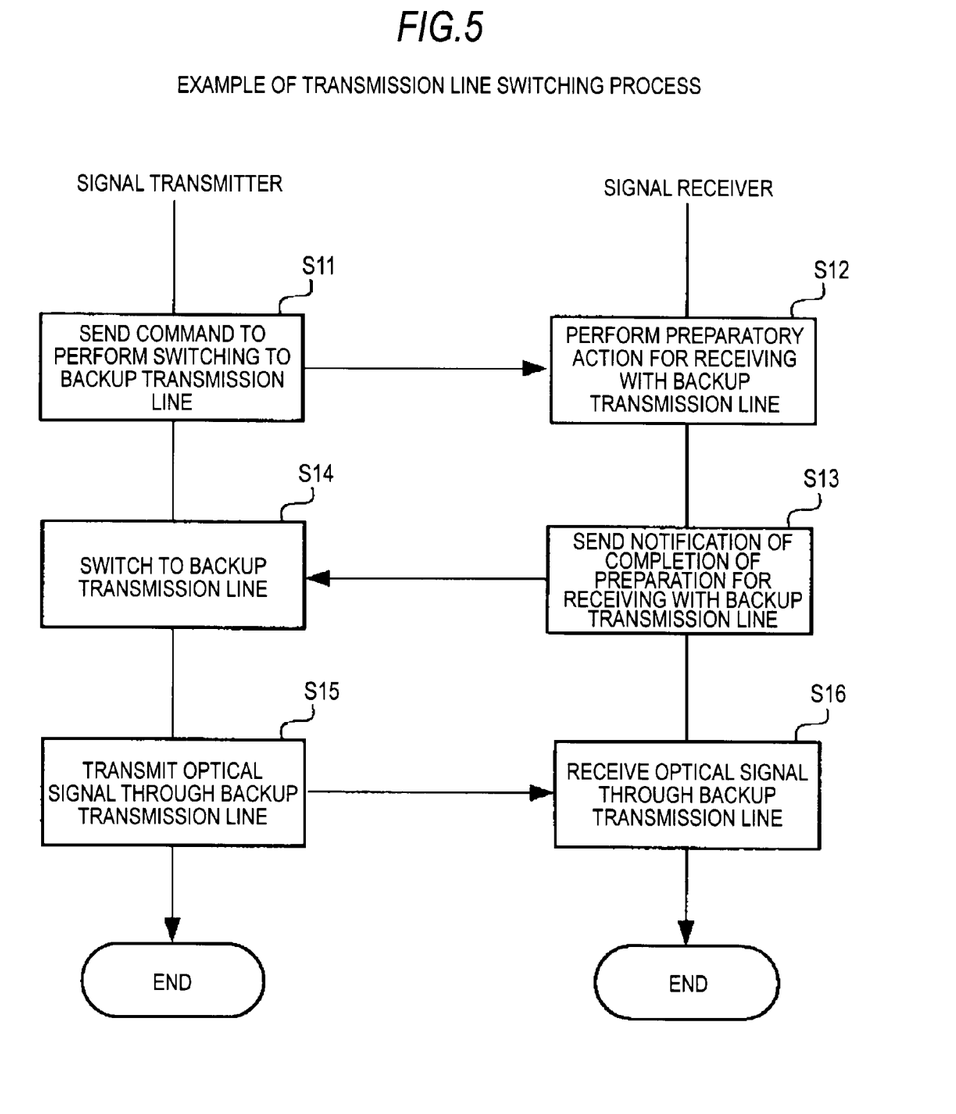
FIG. 5 is a flowchart showing a modified example of a process wherein a signal transmitter selects a transmission line, according to the first and second embodiments of the present invention.

FIG. 5 illustrates a modified example of a process of switching from the main transmission lines to the backup transmission lines.

The modified example will be described for the signal transmission system 1 according to the first embodiment; however, the same modified example can be applied to the signal transmission system 2 according to the second embodiment.

First, the first controller 18 of the signal transmitter 10 outputs a command to perform switching to any one of the backup transmission lines 34a and 34b during the transmission of optical signals through the main transmission lines 33a to 33d (step S11). This command may be output under the control of the signal transmitter 10 even when no error has occurred in any of the main transmission lines 33a to 33d.

Next, the second controller 28 of the signal transmitter 10 performs a preparatory action for receiving the optical signals through the backup transmission lines based on the received switching command (step S12). Then, the second controller 28 sends a notification of completion of preparation for receiving with the backup transmission lines to the signal transmitter 10 (step S13).

Next, upon receiving the notification of completion from the signal receiver 20, the first controller 18 switches the transmission lines for transmitting the optical signals from the main transmission lines to any one of the backup transmission lines 34a and 34b (step S14).

Next, the signal transmitter 10 transmits the optical signals using the remaining main transmission lines and the switched backup transmission lines (step S15). Then, the signal receiver 20 receives the optical signals through the switched backup transmission lines (step S16).

In this way, the signal transmitter 10 is able to cause the signal receiver 20 to perform switching from the main transmission lines to the backup transmission lines. Therefore, the transmission lines can be easily switched even during the transmission of the optical signals, and maintenance is made easy.

The present application contains subject matter related to that disclosed in Japanese Priority Patent Application JP 2009-004109 filed in the Japan Patent Office on Jan. 9, 2009, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A signal transmitter comprising:
    a main transmission line-transmitting portion that transmits optical signals through a plurality of main transmission lines;
    a backup transmission line-transmitting portion that transmits the optical signals through backup transmission lines paired with the main transmission lines;
    a selector that selects a transmission line to be used for transmitting the optical signals from any of the transmission lines through which the optical signals are transmitted by the main transmission line-transmitting portion and the backup transmission line-transmitting portion;
    a control signal transmission portion that transmits a first control signal to a signal receiver through a first control line different than the plurality of main transmission lines and backup transmission lines;
    a control signal reception portion that receives a second control signal from the signal receiver through a second control line different than the plurality of main transmission lines and backup transmission lines; and
    a controller that, in response to the second control signal indicating that a fault has occurred on at least one of the main transmission lines, sends the first control signal identifying a switching command to the signal receiver, and outputs the switching command to the selector, based on information received in the second control signal identifying the main transmission line with the fault which is received from the signal receiver receiving the optical signals, which causes the main transmission line-transmitting portion to stop transmitting the optical signals to the main transmission line with the fault, while causing the backup transmission line-transmitting portion to transmit the optical signals being transmitted to the main transmission line with the fault to the backup transmission lines.

2. The signal transmitter according to claim 1, wherein:
    the main transmission line-transmitting portion and the backup transmission line-transmitting portion each include an electrical-to-optical converter that converts electrical signals being transmitted to the transmission line selected by the selector to the optical signals, and
    the controller decreases power supplied to the electrical-to-optical converter corresponding to the main transmission lines or the backup transmission lines through which the optical signals are not transmitted to be lower than power supplied to the electrical-to-optical converter corresponding to the main transmission line or the backup transmission line through which the optical signals are transmitted.

3. The signal transmitter according to claim 2, further comprising:
    a parallel/serial converter that converts parallel input electrical signals to serial electrical signals and supplies the serial electrical signals to the selector.

4. The signal transmitter according to claim 3, wherein the controller
    outputs a command that switches one of the main transmission lines used by the main transmission line-transmitting portion to one of the backup transmission lines so that the optical signals are transmitted through the selected backup transmission line, and
    transmits information, within the first control signal, identifying the switched backup transmission line to the signal receiver.

5. The signal transmitter according to claim 4, wherein the main transmission line-transmitting portion and the backup transmission line-transmitting portion embed an error check code in the electrical signals.

6. The signal transmitter of claim 1, wherein the first control signal and the second control signal are electrical signals.

7. A signal receiver comprising:
    a main transmission line-receiving portion that receives optical signals through a plurality of main transmission lines;
    a backup transmission line-receiving portion that receives the optical signals through backup transmission lines paired with the main transmission lines;
    a selector that selects a transmission line to be used for receiving the optical signals from any of the transmission lines through which the optical signals are received by the main transmission line-receiving portion and the backup transmission line-receiving portion;
    a control signal reception portion that receives a first control signal from a signal transmitter through a first control line different than the plurality of main transmission lines and backup transmission lines;
    a control signal transmission portion that transmits a second control signal through a second control line different than the plurality of main transmission lines and backup transmission lines; and
    a controller that, in response to a fault that has occurred on at least one of the main transmission lines, transmits the second signal including information identifying the main transmission line with the fault to the signal transmitter transmitting the optical signals and outputs a switching command to the selector, thus causing the main transmission line-receiving portion to stop receiving the optical signals from the main transmission line with the fault, while causing the backup transmission line-receiving portion to receive the optical signals being received from the main transmission line with the fault from a backup transmission line designated by the signal transmitter in the first control signal.

8. The signal receiver according to claim 7, wherein:
the main transmission line-receiving portion and the backup transmission line-receiving portion each include a photoelectric converter that converts the optical signals being received through the main transmission lines and the backup transmission lines to electrical signals, and
the controller decreases power supplied to the photoelectric converter corresponding to the main transmission lines or the backup transmission lines through which the optical signals are not transmitted to be lower than power supplied to the main transmission lines or the backup transmission lines through which the optical signals are transmitted.

9. The signal receiver according to claim 8, further comprising:
a serial/parallel converter that converts serial electrical signals supplied from the selector to parallel electrical signals and outputs the parallel electrical signals.

10. The signal receiver according to claim 9, wherein the controller detects the fault on the main transmission lines by decoding an error check code embedded in the electrical signals that are photoelectrically converted from the optical signals.

11. The signal receiver according to claim 9, wherein the controller detects the fault on the main transmission lines from a change in a level of the optical signals.

12. The signal receiver of claim 7, wherein the first control signal and the second control signal are electrical signals.

13. A signal transmission system comprising:
a signal transmitter; and
a signal receiver, wherein
the signal transmitter includes:
a main transmission line-transmitting portion that transmits optical signals through a plurality of main transmission lines;
a backup transmission line-transmitting portion that transmits the optical signals through backup transmission lines paired with the main transmission lines;
a first selector that selects a transmission line to be used for transmitting the optical signals from any of the transmission lines through which the optical signals are transmitted by the main transmission line-transmitting portion and the backup transmission line-transmitting portion;
a first control signal transmission portion that transmits a first control signal to the signal receiver through a first control line different than the plurality of main transmission lines and backup transmission lines;
a first control signal reception portion that receives a second control signal from the signal receiver through a second control line different than the plurality of main transmission lines and backup transmission lines; and
a first controller that, in response to the second control signal indicating that a fault has occurred on at least one of the main transmission lines, sends the first control signal identifying a switching command to the signal receiver, and outputs the switching command to the first selector, based on information received in the second control signal identifying the main transmission line with the fault, which is received from the signal receiver receiving the optical signals, which causes the main transmission line-transmitting portion to stop transmitting the optical signals to the main transmission line with the fault, while causing the backup transmission line-transmitting portion to transmit the optical signals being transmitted to the main transmission line with the fault to the backup transmission lines designated by the signal receiver; and the signal receiver includes
a main transmission line-receiving portion that receives optical signals through the main transmission lines;
a backup transmission line-receiving portion that receives the optical signals through the backup transmission lines;
a second selector that selects a transmission line to be used for receiving the optical signals from any of the transmission lines through which the optical signals are received by the main transmission line-receiving portion and the backup transmission line-receiving portion; and
a second control signal reception portion that receives the first control signal from the signal transmitter through the first control line different than the plurality of main transmission lines and backup transmission lines;
a second control signal transmission portion that transmits the second control signal to the signal transmitter through the second control line different than the plurality of main transmission lines and backup transmission lines; and
a second controller that, when the fault occurs on at least one of the main transmission lines, transmits the second signal including information identifying the main transmission line with the fault to the signal transmitter transmitting the optical signals and outputs a switching command to the selector, thus causing the main transmission line-receiving portion to stop receiving the optical signals from the main transmission line with the fault, while causing the backup transmission line-receiving portion to receive the optical signals being received from the main transmission line with the fault from the backup transmission line designated by the signal transmitter in the first control signal.

14. The signal transmission system of claim 13, wherein the first control signal and the second control signal are electrical signals.

* * * * *